(12) United States Patent
Ruengeler (10) Patent No.: US 12,467,968 B2
(45) Date of Patent: Nov. 11, 2025

(54) METHOD OF DETERMINING A FIGURE OF MERIT OF AT LEAST ONE COMPONENT UNDER TEST WITHIN A SIGNAL CHAIN AND MEASUREMENT INSTRUMENT

(71) Applicant: Rohde & Schwarz GmbH & Co. KG, Munich (DE)

(72) Inventor: Matthias Ruengeler, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 345 days.

(21) Appl. No.: 18/333,186

(22) Filed: Jun. 12, 2023

(65) Prior Publication Data

US 2024/0410933 A1 Dec. 12, 2024

(51) Int. Cl.
*G01R 31/28* (2006.01)
*G01R 27/28* (2006.01)

(52) U.S. Cl.
CPC ......... *G01R 31/2822* (2013.01); *G01R 27/28* (2013.01); *G01R 31/2841* (2013.01)

(58) Field of Classification Search
CPC . G01R 31/2822; G01R 27/28; G01R 31/2841
See application file for complete search history.

(56) References Cited

U.S. PATENT DOCUMENTS

| | | | | |
|---|---|---|---|---|
| 10,673,545 B1* | 6/2020 | Kurvathodil | ........... | H04B 17/13 |
| 11,366,193 B2* | 6/2022 | Ramian | ................ | G01R 23/005 |
| 2018/0188306 A1* | 7/2018 | Pal | .......................... | G01R 29/26 |
| 2019/0064236 A1* | 2/2019 | Verspecht | .............. | H04B 17/29 |
| 2019/0356397 A1* | 11/2019 | DaSilva | ................. | G01R 1/045 |
| 2019/0369158 A1* | 12/2019 | Murao | ..................... | H03F 3/193 |
| 2024/0306018 A1* | 9/2024 | Ruengeler | .............. | H04B 17/29 |
| 2024/0410942 A1* | 12/2024 | Ruengeler | .............. | H04B 17/21 |

FOREIGN PATENT DOCUMENTS

EP 3767309 B1 2/2023

* cited by examiner

*Primary Examiner* — David Bilodeau
(74) *Attorney, Agent, or Firm* — CHRISTENSEN O'CONNOR JOHNSON KINDNESS PLLC (57) ABSTRACT

The present disclosure generally relates to a method of determining a figure of merit of at least one component under test within a signal chain and a measurement instrument. The signal chain has several components and is an internal and/or external signal chain. A measurement signal is captured at a port of the signal chain. An overall figure of merit of the signal chain is determined. The measurement signal is repeatedly captured at the port of the signal chain while altering at least one setting of one of the several components of the signal chain per repetition. The overall figure of merit of the signal chain is determined for each repetition. The at least one setting is altered such that the contribution of the respective component under test to the overall figure of merit of the signal chain is increased with respect to contributions of remaining components of the signal chain.

19 Claims, 2 Drawing Sheets

METHOD OF DETERMINING A FIGURE OF MERIT OF AT LEAST ONE COMPONENT UNDER TEST WITHIN A SIGNAL CHAIN AND MEASUREMENT INSTRUMENT

FIELD OF THE DISCLOSURE

The present disclosure generally relates to a method of determining a figure of merit of at least one component under test within a signal chain and a measurement instrument.

BACKGROUND

In modern electronic devices, input signals are often fed through signal chains having multiple individual components arranged in series with each other. All of these components of the signal chain individually influence the transmitted signal based on the respective properties of each component before the resulting signal is output by the signal chain. These influences can be considered nonlinearities applied to the signal being processed. In addition, each component of the signal chain causes noise whereby the processed signal is affected as well. To improve the signal quality output by the signal chain a precise characterization of each individual component within the signal chain is required.

One approach concerns splitting up the signal chain or extracting individual components thereof to precisely determine its respective properties without any cross correlation effects caused by other components of the signal chain.

However, this approach is time consuming and, therefore, high expenses are caused.

In addition, extracting at least some of the components of a signal chain may even not be readily possible since at least some of the components may be permanently coupled with each other.

Moreover, extracting components, detecting their properties, and implementing the respective components into the signal again may potentially cause additional alterations of the influences (nonlinearities and/or noise) onto the signal processed by the signal chain. This effect may be caused by modified cross correlation effects between individual components within the signal chain due to the extraction and implementing procedures.

Hence, there is a need for a method and a measurement instrument based on which the disadvantages according to known methods may be overcome or at least may be reduced.

SUMMARY

A summary of certain embodiments disclosed herein is set forth below. It should be understood that these aspects are presented merely to provide a brief summary of these embodiments and that these aspects are not intended to limit the scope of this disclosure. This disclosure may encompass a variety of aspects that may not be set forth below. Some aspects as explained in view of methods, others in view of devices. However, the respective aspects are to be correspondingly transferred from methods to devices and vice versa.

Embodiments of the present disclosure relate to a method of determining a figure of merit of at least one component under test within a signal chain having several components. The signal chain is an internal and/or external signal chain. Put differently, the signal chain may be entirely internal or external, or may also be partly internal and partly external. Accordingly, the components may be external and/or internal components.

In an embodiment, the method comprises at least the following steps. The measurement signal is captured at a port of the signal chain. An overall figure of merit of the signal chain is determined. The measurement signal is repeatedly captured at the port of the signal chain while altering at least one setting of one of the several components of the signal chain per repetition. The overall figure of merit of the signal chain is determined for each repetition. The at least one setting is altered such that the contribution of the respective component under test to the overall figure of merit of the signal chain is increased with respect to contributions of remaining components of the signal chain at least once.

Put differently, measurement signals are repeatedly captured at the port of the signal chain. By altering a setting of the component under test the contribution of the component under test to the overall figure of merit can be increased. Put differently, the level of dominance of the contribution of the respective component under test can be increased relative to contributions of other components of the signal chain. Hence, the contribution of the component under test may be more prominent as compared to contributions of the other components. Based on this modification procedure, the component under test may be precisely characterized with regard to its (electronic) properties without any structural changes to the signal chain.

For example, in case of an attenuator or amplifier, a gain setting could be altered upon repetitions of capturing the measurement signal. As a consequence, the contribution of the respective component under test is increased with regard to remaining components of the signal chain. This allows to extract the contribution of the component from the overall figure of merit. Hence, the expenses for characterizing components of a signal chain are greatly reduced. Also, the time period needed to characterize several components of the signal chain is significantly reduced since structural changes to the signal chain may be avoided.

Accordingly, the properties of the individual component within the signal chain can be determined without any modification to the signal chain per se.

Within the present context, the measurement signal being captured is not required to represent a specific measurement signal input within the meaning of representing an answer to an applied signal. Rather, the measurement signal being captured may also only represent a noise signal being detected at the port of the signal chain.

Alternatively or additionally, at least in some embodiments, a signal or multiple specific measurement signals may be applied to a port of the signal chain and the respective answer(s) may subsequently be captured, namely processed signal(s) obtained. This may be advantageous to evaluate specific modifications caused to the applied measurement signal(s) by respective components under test being part of the signal chain. So, based on applying specific measurement signals a more detailed insight may be acquired into the properties of the at least one component under test of the signal chain.

In some embodiments, it depends on the figure of merit whether a signal is applied at an input port or not. In any case, a measurement signal is captured at the respective port, which may be associated with noise or the signal applied at the input port.

Generally, the port at which the measurement signal is captured may relate to an input port, an output port or an internal port. Thus, the respective port may be located within the signal chain or at one of its ends. In some embodiments, the measurement signal may be captured anywhere along the signal chain. Accordingly, the port relates to an interface at which the measurement signal can be captured appropriately. For instance, the measurement signal is captured after an analog-to-digital conversion and an acquisition memory, e.g., an acquisition random access memory (RAM).

In some embodiments, a respective contribution to the figure of merit is determined for several (multiple) components under test of the signal chain by repeatedly capturing the measurement signal at the port of the signal chain while altering at least one setting of one of the several components under test of the signal chain per repetition. Put differently, the method may be repeated in view of several or every single component(s) under test comprised within the signal chain. This allows characterizing even the entire signal chain with regard to its properties, for example each component under test of the signal chain individually.

Optionally, the at least one setting is modified at least such that for each of the components under test of the signal chain at least one component-dependent specific requirement is met at least once. Therefore, the characterization procedure may be better defined since the component specific requirements may ensure that specific conditions are met. For example, a signal-to-noise ratio above a certain threshold value may be guaranteed at least once for several, for example every, component under test of the signal chain based on an alteration of the settings of the component under test. This allows nonlinearities and noise caused by the component under test to be comparable to values determined for other components of the signal chain. In other words, the component-dependent specific requirements guarantee a comparableness of the determined (electronic) properties in view of the (electronic) properties determined for other components of the signal chain.

In some embodiments, upon repetitions of capturing the measurement signals, the at least one setting is modified at least such that for several (or each) components under test of the signal chain an intermodulation product exceeds a component-specific threshold value relative to ground noise at least once. Here, intermodulation (IM) may be considered the amplitude modulation of signals containing two or more different frequencies, caused by nonlinearities or time variance in a system. By ensuring that the IM product exceeds the threshold value which itself is determined relative to ground noise, a specific signal quality is guaranteed. In some embodiments, a desired signal-to-noise ration may be guaranteed. As a consequence, the characterization of the (electronic) properties of the component under test can be performed with higher precision.

Optionally, at least one user interface is provided. For example, the user interface may be connected to a determination circuit. Based on the user interface several information may be provided to a user or commands may be received via the user interface such that the method may be tailored.

In some embodiments, the overall figure of merit of the signal chain and/or a figure of merit of at least one component under test and/or the contribution of individual components to the overall figure of merit is provided via the user interface. Hence, the comfort for the user is greatly improved.

Optionally, at least one external component is added to the signal chain via the user interface and/or the signal chain is defined via the user interface. Thereby, additional possibilities are provided for a user to tailor the method as desired.

In some embodiments, the at least one setting is altered via the user interface and/or a state of the signal chain is switched during subsequent repetitions via the user interface and/or or a user is prompted via the user interface to change a state of a signal of the at least one external component. Put differently, based on the user interface specific commands may be received so as to define settings of components of the signal chain. In an alternative, specific requests may be prompted via a user interface for improving the method. Accordingly, a user may directly influence the method as desired.

In some embodiments, the figure of merit is at least one of a noise figure (NF), a third order intercept (TOI), a gain, or an attenuation. The TOI may be considered to represent the nonlinearities caused by a component under test to the signal transmitted through the signal chain. Accordingly, the component under test may be precisely characterized with regard to its (electronic) properties being of interest, such as a gain or attenuation as well.

In telecommunications, a TOI point is a specific figure of merit associated with the more general third-order IM distortion, which is a measure for weakly nonlinear systems and devices, for example receivers, linear amplifiers, mixers, etc. It is based on the idea that the device nonlinearity can be modeled using a low-order polynomial, derived by means of Taylor series expansion. The TOI point relates nonlinear products caused by the third-order nonlinear term to the linearly amplified signal. Hence, the TOI may be used to identify an (unwanted) influence of the respective component under test onto a transmitted signal. Of course there are influences onto the signal which are specifically wanted such as attenuating or amplifying. What is meant here is a generally unwanted influence on the signal quality per se.

In some embodiments, the figure of merit is measured at an analog-to-digital converter that is part of the signal chain. Considering the analog-to-digital converter guarantees that the signal properties are detected with high resolution as the gain of the analog-to-digital converter may be appropriately adjusted.

Optionally, the TOI may be measured by inserting a dual tone signal at an input port of the signal chain while measuring the power of the continuous waves and the intermodulation products with the ADC.

In some embodiments, the NF is measured by either applying no signal at all to the port, by switching the input port to a defined resister, by applying a defined resister to the port, or by applying a noise source with known noise power. The noise power may then be measured via the analog-to-digital converter.

In this regard, initially, the measurement system can only capture the total NF and total TOI of the complete signal chain. By changing the parameters of the components under test comprised within the chain (e.g. preamp stages or gains, attenuator settings) different operating points of the respective components under test can be evaluated. As a consequence, applying an algorithm, the NF and TOI of each component under test of the signal chain may be determined based on a respective equation system. The equation system comprises formulas which relate the impact of the TOI and NF of each component under test of the signal chain to the total measured NF and TOI in dependence of the configuration of the components, i.e. in dependence of the respective settings of the component under test. The repetition of capturing the measurement signal while altering the settings of the component under test then provides different measured signals at the output of the signal chain, where the contribution of the component under test may be extrapolated based on the equation system.

It should be noted again that no specific measurement signal may necessarily be captured since the entire evaluation procedure may also be based on purely capturing a respective noise signal upon a variation of the settings of the component(s) under test.

In some embodiments, the TOI of a signal chain comprising devices having respective TOIs, here denoted as Ip3i,xx (in dB), and with gains gi (in dB) may be determined via:

$$[IP3]\_(i, tot) =$$
$$-10 \cdot \log_{10}(10^{\wedge}([IP3]\_(i, 1)/10) + 10^{\wedge}([g\_1-IP3]\_(i, 2)/10) +$$
$$10^{\wedge}((g\_1 + G\_2 [-IP3]\_(i, 3))/10) + \ldots)$$

Here, IP3i,tot denotes the total TOI of the signal chain, i denotes a respective component.

The NF of a system having n components may be determined via:

$$F\_ges = F\_1 + (F\_2'11)/G\_1 +$$
$$(F\_3 - 1)/(G\_1\ G\_2) + \cdots + (F\_n - 1)/(\prod\_(i = 1)^{\wedge}(n - 1) G\_i)$$

Here, Fi denotes the NF of a specific component i, Gi denotes the gain of a respective component i, and Fges denotes the total NF of the signal chain respectively measured.

In some embodiments, a sensitivity of the contribution of the respective component under test to at least one of the overall figure of merit, a third order intercept point (TOI point), a noise figure, or a different figure of merit of the signal chain is determined. The sensitivity gives information about a reliability of identifying the contribution of the respective component under test to the at least one of the overall figure of merit, the third order intercept point, the noise figure, and the different figure of merit when capturing the measurement signal in view of the component's settings. Put differently, the sensitivity represents a confidence level with regard to the determined contribution in view of a specific component under test.

In some embodiments, the component's settings are modified upon repetitions of capturing the measurement signal if the sensitivity is below a predetermined threshold value. Put differently, a sensitivity which is below the predetermined threshold value may indicate that the confidence is too low to be trusted. Hence, the component's settings may be altered and a repeated measurement signal may be subsequently captured so as to acquire an increased sensitivity level, preferably a sensitivity which exceeds the predetermined threshold value.

In some embodiments, an output signal is output in case the sensitivity determined is low, wherein the output signal is a notification informing a user about the low sensitivity or a control signal that alters the at least one setting and initializes capturing of an additional measurement signal. Since a low sensitivity indicates that the confidence with regard to a determined contribution of a component under test is low, the user can thus be informed about this fact. This provides the user with the possibility to alter the measurement method so as to characterize the component under test with higher sensitivity, e.g., if specific settings for the component under test are applied.

Optionally, the sensitivity determined is output via a user interface. Thus, the user is directly informed about how reliable the characterization of the component under test is to be considered.

In some embodiments, limits for the sensitivity are input via a user interface. This provides the possibility to automatically alter the settings for a component under test until the determined contribution of the respective component under test is determined with a sensitivity meeting the limits received via the user interface.

In some embodiments, a figure of merit of an external component or a contribution of the external component to the overall figure of merit is input via user interface or a database. It may be that specific components of the signal chain have been characterized with regard to their (electronic) properties before. Accordingly, such information can be made use of. This allows the measurement method to be sped up.

Some embodiments of the present disclosure relate to a measurement instrument for determining a figure of merit of at least one component under test within a signal chain having several components. The signal chain is an internal and/or external signal chain. In an embodiment, the measurement instrument is configured to capture a measurement signal at a port of the signal chain, determine an overall figure of merit of the signal chain, and repeatedly capture the measurement signal at the port of the signal chain while altering at least one setting of one of the several components of the signal chain per repetition. The overall figure of merit of the signal chain is determined for each repetition. The at least one setting is altered such that the contribution of the respective component under test to the overall figure of merit of the signal chain is increased with respect to contributions of remaining components of the signal chain.

The advantages achieved in view of the before mentioned method are correspondingly achieved also in view of the measurement instrument. In essence, the measurement instrument guarantees that several components under test of a signal chain may be characterized with regard to their (electronic) properties without any structural changes to the signal chain required thereupon. Rather, only settings of respective components of the signal chain are altered upon repetitions of capturing the measurement signal. Therefore, the measurement instrument allows precise characterization results to be achieved at short measurement periods and causing only low expenses.

In some embodiments, the measurement instrument is coupled to an internal or external signal generator capable of generating a measurement signal applied to the signal chain and/or a user interface capable of outputting the contribution of the respective component under test to the overall figure of merit of the signal chain. Accordingly, an appropriate measurement signal may be generated and applied to the signal chain to even characterize the component under test in a more sophisticated manner. For example, the external or internal signal generator may be controllable so as to apply a specific measurement signal with a minimum TOI to the signal chain. Also, respective results of the determination procedure may be output via the user interface.

In some embodiments, the measurement instrument comprises a determination circuit capable of determining the alternation of the at least one setting. Therefore, the determination circuit may be coupled to the components of the signal chain.

Optionally, the determination circuit may also be configured to evaluate the measurement signal received at a (n output) port of the signal chain to characterize the components of the signal chain, for example, with regard to the NF and the TOI.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. All of the features disclosed hereinafter with respect to the example embodiments and/or the accompanying figures can alone or in any sub-combination be combined with features of the aspects of the present disclosure including features of preferred embodiments thereof, provided the resulting feature combination is reasonable to a person skilled in the art.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
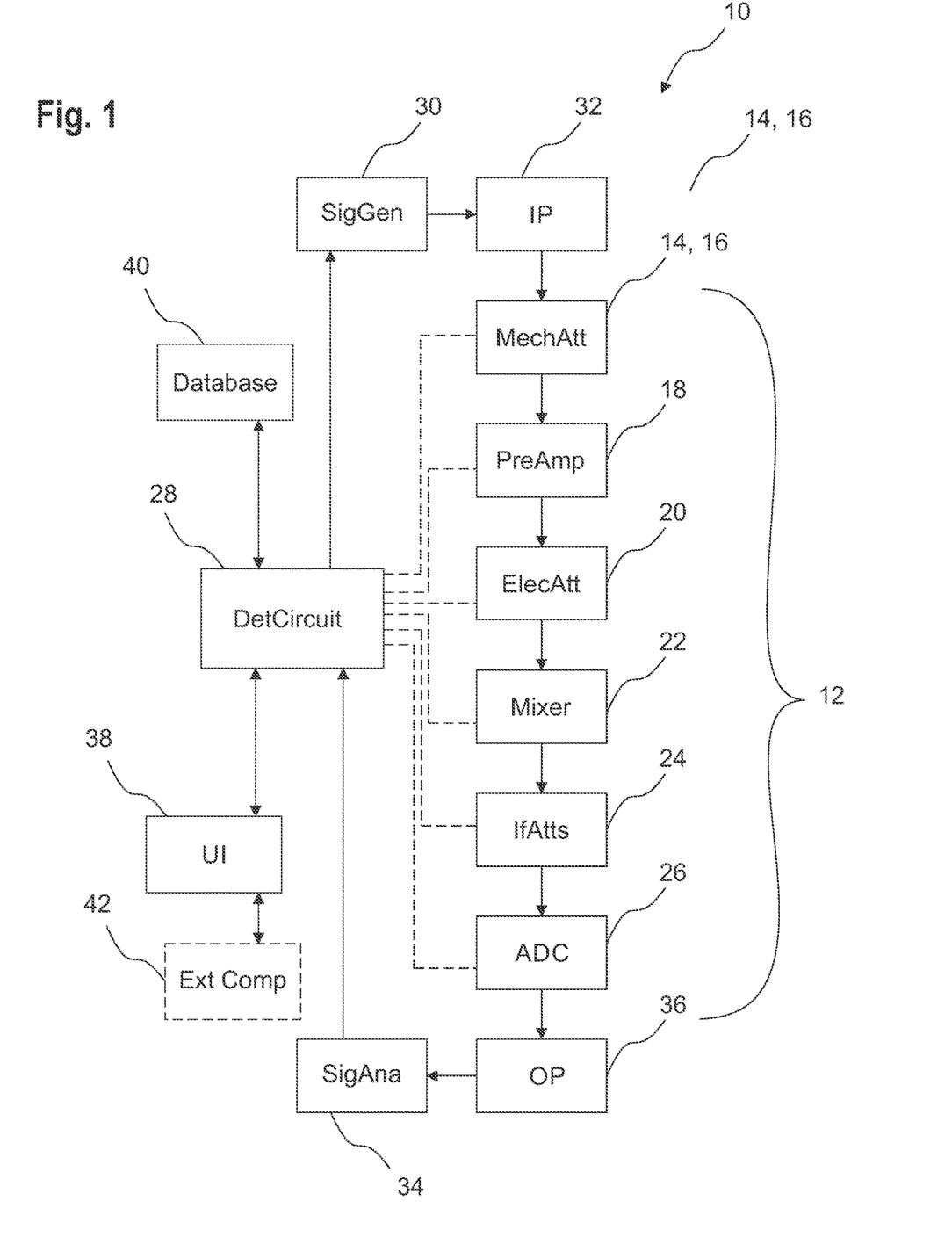
FIG. 1 is a schematic drawing of a measurement instrument according to an embodiment of the present disclosure.

FIG. 1 is a schematic drawing of a measurement instrument 10 in accordance with an embodiment of the present disclosure. The measurement instrument 10 is coupled to a signal chain 12. The signal chain 12 is an internal and/or external signal chain 12. This means that the signal chain 12 may also be partly internal and partly external.

The signal chain 12 comprises several components 14, for example internal and/or external components 14. In the embodiment shown, the signal chain 12 comprises a mechanical attenuator 16, a preamplifier 18, an electronic attenuator 20, a mixer 22, an IF attenuator 24, and an analog-to-digital converter 26, which are coupled in series.

The order of the individual components 14 of the signal chain 12 is only exemplary and could be different in some embodiments. For example, the electronic attenuator 20 and IF attenuator 24 could also be in reverse order compared to the embodiment shown.

According to the present embodiment, the measurement instrument 10 comprises a determination circuit 28. In the shown embodiment, the determination circuit 28 is coupled to a signal generator 30 which itself is coupled to an input port 32 of the signal chain 12, where the mechanical attenuator 16 is coupled to the input port 32. The signal generator 30 is configured to generate a measurement signal which may be applied via the input port 32 to the signal chain 12.

Alternatively, an external signal source may be used for providing a measurement signal. According to a further alternative, the signal generator 30 may also be omitted.

The determination circuit 28 is also coupled to a signal analyzer 34 which itself is coupled to an output port 36 coupled to the signal chain 12. In some embodiments, the analog-to-digital converter 26 is coupled to the output port 36.

In some embodiments, the signal analyzer 34 is configured to analyze a measurement signal being captured with respect to the signal chain 12. According to this embodiment, a specific measurement signal is applied beforehand to the signal 12 where the measurement signal is generated by the signal generator 30. This means the measurement signal is fed through the signal chain 12 and the respective response is captured and analyzed using the signal analyzer 34. In addition, the result of the analysis performed by the signal analyzer 34 is provided to the determination circuit 28.

In other embodiments, it may also be possible that a measurement signal is captured without applying a specific signal beforehand, e.g., capturing a noise signal.

In an alternative embodiment, the signal analyzer 34 may be directly coupled to the analog-to-digital converter 26. In other words, the output port 36 is established by the analog-to-digital converter 26.

In another alternative embodiment, the evaluation of the measurement signal may also be performed at the analog-to-digital converter 26 of the signal chain 12 and provided to the determination circuit 28 from the analog-to-digital converter 26. In this case, the signal analyzer 34 and/or the output port 36 may be omitted.

According to the present embodiment shown in FIG. 1, the determination circuit 28 is connected to the components 14 of the signal chain 12. The determination circuit 28 is specifically configured to determine settings of the components 14 of the signal chain 12. The determination circuit 28 is also configured to alter the settings applied to the individual components 14 of the signal chain 12 upon repetitions of capturing the measurement signal. For example, a gain of the analog-to-digital converter 26 may be varied upon repetitions of capturing the measurement signal.

According to this embodiment, the measurement instrument 10 also comprises a user interface 38 coupled to the determination circuit 28. Via the user interface 38, the determination circuit 28 may output determined figures of merit, gains, attenuations and so forth of specific components 14, e.g. the individual contribution(s) to the overall figure of merit, or total figures of merit of the signal chain 12 as determined in view of the capturing of the measurement signal with respect to the signal chain 12.

Generally, the figure of merit is a noise figure or a third order intercept (TOI). Hence, the overall noise figure or third order intercept (TOI) of the signal chain 12 may be determined as well as the respective contribution(s) of the individual components 14 thereto.

In addition, the determination circuit 28 is also coupled to a database 40. The database 40 may for example comprise information with regard to (individual) figures of merit of specific components 14 of the signal chain 12 since these components 14 may have been characterized with regard to their (electronic) properties before. Put differently, the database 40 may comprise information concerning known figures of merit of specific components 14.

Optionally, via the user interface 38 a single or multiple external components 42 may be added to the signal chain 12 (as schematically illustrated). Put differently, the signal chain 12 may be altered by one or multiple external components 42 switched to the signal chain 12. As a consequence, the measurement signal may be guided through a specifically determined order (and acquired in view of this order) of components 14 which the signal chain 12 should comprise, where this order is specified via the user interface 38.

Figure 2:
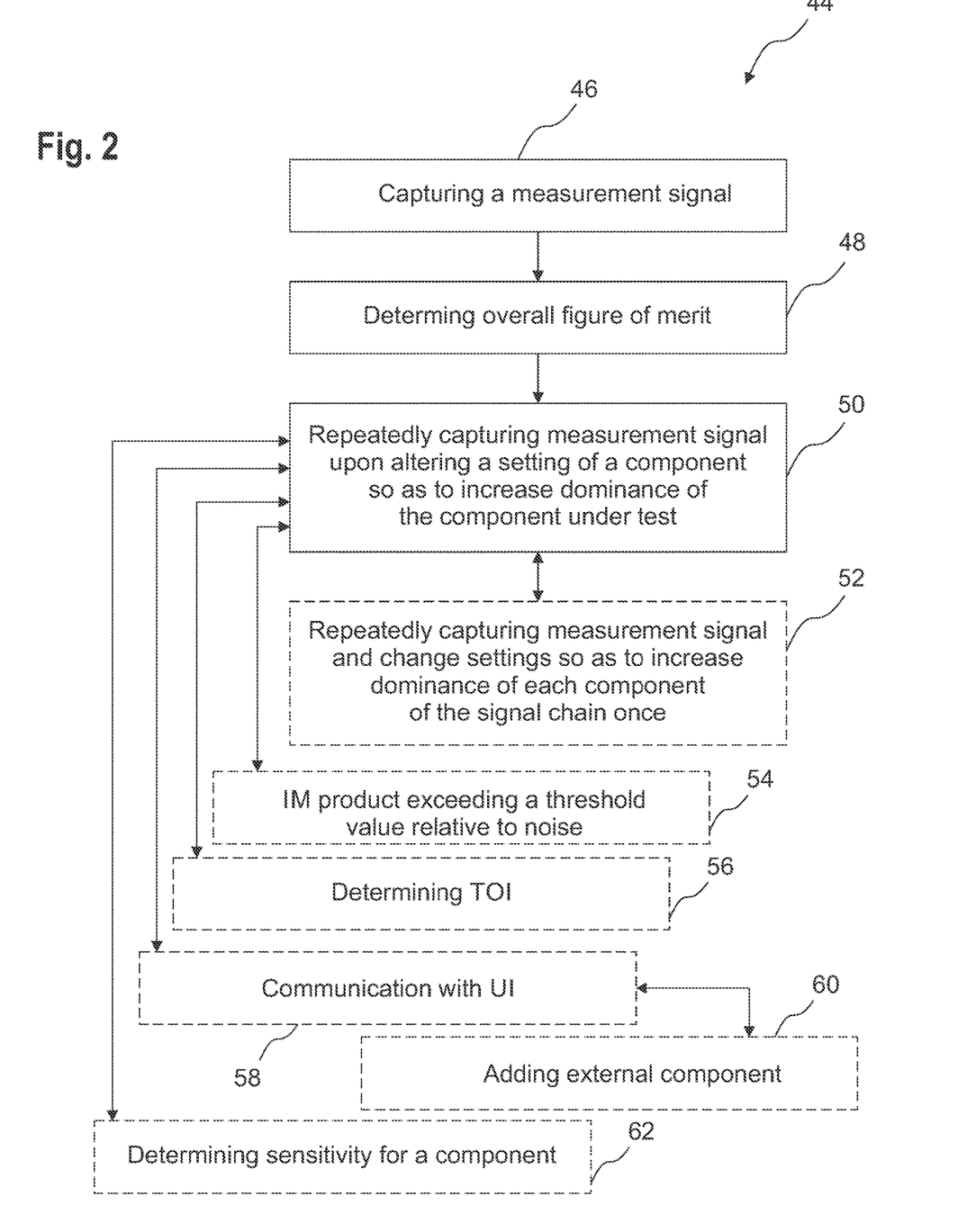
FIG. 2 is a schematic drawing of a representative method of determining a figure of merit of at least one component under test within a signal chain having several components.

FIG. 2 is a schematic drawing of a representative method 44 for determining a figure of merit of at least one component 14 under test within a signal chain 12 having several components 14. Optional steps are shown in dashed lines.

In step 46, a measurement signal is captured at a port of the signal chain 12, here at the output port 36 of the signal chain 12. In this embodiment, the measurement signal is provided by the signal generator 30. However, the application of the measurement signal is merely optional.

Generally, applying a (specific) measurement signal is not necessarily needed. In some embodiments, the method 44 may also purely rely on capturing measurement signals in view of the signal chain 12 without specifically applying a measurement signal (at the input port 32). For example, the captured measurement signal can represent a nose signal captured in view of the signal chain 12.

In step 48, an overall figure of merit of the signal chain 12 is determined. This may be achieved by the signal analyzer 34 in combination with the determination circuit 28.

In step 50, the measurement signal is repeatedly captured at the port of the signal chain 12, e.g., the output port 36, while altering at least one setting of one of the several components 14 of the signal chain 12 per repetition.

The alteration of the setting may be achieved via the determination circuit 28. The overall figure of merit of the signal chain 12 is determined for each repetition. The at least one setting is altered, e.g. via the user interface 38, such that the contribution of the respective component 14 under test to the overall figure of merit of the signal chain 12 is increased with respect to contributions of remaining components 14 of the signal chain 12. This means that the dominance of the respective component 14 under test is increased over the remaining components 14 comprised within the signal chain 12. For example, component specific settings may be altered, such as a gain or an attenuator setting or the like. In some embodiments, a state of the signal chain 12 may be switched during subsequent repetitions, e.g. via the user interface 38.

Accordingly, the (electronic) properties of a component 14 under test of the signal chain 12 may be extracted from the measurement results of the total figure of merit of the signal chain 12 determined in view of alterations of the settings of the component 14 upon repetitions of capturing the measurement signal. As a consequence, a time efficient and precise method 44 is provided for determining (electronic) properties of components 14 of a signal chain 12 without the need of structural changes being made to the signal chain 12.

Step 50 may be modified in various ways to tailor the method 44 according to the respective needs.

For example, according to optional step 52, a respective contribution to the figure of merit is determined for multiple components 14 under test, for example each component 14 under test, of the signal chain 12 by repeatedly capturing the measurement signal at the port of the signal chain 12 while altering at least one setting of one of the several components 14 under test of the signal chain 12 per repetition. Put differently, several or all components 14 of the signal chain 12 may be characterized. This means that the entire signal chain 12 is investigated with regard to its (electronic) properties.

The method 44 may also be modified according to optional step 54, where the at least one setting is modified at least such that for several or each of the components 14 under test of the signal chain 12 at least one component-dependent specific requirement is met at least once.

Here, for example, upon repetitions of capturing the measurement signals, the at least one setting is modified at least such that for several or each of the components 14 under test of the signal chain 12 an intermodulation (IM) product higher than a component-specific threshold value is guaranteed at least once. In this regard, the component-specific threshold value depends on ground noise. Put differently, it is ensured that the IM product exceeds the ground noise according to a component-specific ratio such that a desired signal-to-noise ratio is achieved at least one per component 14 under test. By ensuring that the IM product is higher than the threshold value, a specific signal quality is guaranteed. As a consequence, the characterization of the (electronic) properties of the component under test can be performed with higher precision.

Alternatively or additionally, according to optional step 56, a third order intercept (TOI) point is determined for each of the components 14 under test of the signal chain 12 depending on the respectively captured measurement signal in view of the component's settings.

The method 44 may be also modified according to optional step 58 regarding a communication between the determination circuit 28 and the user interface 38. This provides various ways to improve the method 44, e.g. by outputting total figures of merit determined in view of the signal chain 12, by outputting component-dependent figures of merit or the component's contribution to the total figure of merit, or by receiving user inputs via the user interface 38. For example, the user inputs may specify a specific arrangement of the signal chain 12 to be followed. In addition, the user inputs may also specify respective settings of components 14 of the signal chain 12.

Further optionally, according to step 60, at least one external component 42 is added to the signal chain 12 via the user interface 38. Hence, the method 44 can be altered in various different ways as desired by the user. In this regard, optionally, a figure of merit of the external component 42 may be received via the user interface 38 or via a database 40.

In optional step 62, a sensitivity of the contribution of the respective component 14 under test to the overall figure of merit of the signal chain 12 is determined. In addition to other values, the sensitivity so determined may also be provided by other user interface 38.

Optionally, a notification may be output via the user interface 38 if the sensitivity determined in step 62 is below a certain threshold value.

Moreover, via the user interface 38 limits for the sensitivity may be specified according to user inputs. In this case, method 44 may be repeated and the settings of the component 14 under test may be altered until the limits received by the user interface 38 are met.

For example, in view of the sensitivity so determined in step 62 and the TOI point determined in step 56, the sensitivity may be compared to a predetermined threshold value. If the sensitivity is below the respective sensitivity threshold value, the component's settings are modified upon repetitions of capturing the measurement signal until the sensitivity exceeds the predetermined threshold value.

Certain embodiments disclosed herein include components, e.g., the determination circuit 28, the signal analyzer 34, any of the components in the signal chain, the signal generator, etc., utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically-configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions May be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a graphical processing unit (GPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In some embodiments, the circuitry described above, for example the determination circuit 28 and/or the signal analyzer 34, is programmed to perform one or more steps of any of the methods disclosed herein.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about." "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed The embodiments of the invention in which an exclusive property or privilege is claimed are defined as follows:

1. A method of determining a figure of merit of at least one component under test within a signal chain having several components, wherein the signal chain is an internal and/or external signal chain, wherein the method comprises at least the steps of:
   capturing a measurement signal at a port of the signal chain,
   determining an overall figure of merit of the signal chain, and
   repeatedly capturing the measurement signal at the port of the signal chain while altering at least one setting of one of the several components of the signal chain per repetition, wherein the overall figure of merit of the signal chain is determined for each repetition, and
   wherein the at least one setting is altered such that the contribution of the respective component under test to the overall figure of merit of the signal chain is increased with respect to contributions of remaining components of the signal chain.

2. The method of claim 1, wherein a respective contribution to the figure of merit is determined for several components under test of the signal chain by repeatedly capturing the measurement signal at the port of the signal chain while altering at least one setting of one of the several components under test of the signal chain per repetition.

3. The method of claim 1, wherein the at least one setting is modified at least such that for several of the components under test of the signal chain at least one component-dependent specific requirement is met at least once.

4. The method according to claim 1, wherein, upon repetitions of capturing the measurement signals, the at least one setting is modified at least such that for several of the components under test of the signal chain an intermodulation product exceeds a component-specific threshold value relative to ground noise at least once.

5. The method according to claim 1, wherein at least one user interface is provided that is connected to a determination circuit.

6. The method according to claim 5, wherein the overall figure of merit of the signal chain and/or a figure of merit of at least one component under test and/or the contribution of individual components to the overall figure of merit is provided via the user interface.

7. The method according to claim 5, wherein at least one external component is added to the signal chain via the user interface and/or the signal chain is defined via the user interface.

8. The method according to claim 7, wherein the at least one setting is altered via the user interface and/or a state of the signal chain is switched during subsequent repetitions via the user interface and/or or a user is prompted via the user interface to change a state of a signal of the at least one external component.

9. The method according to claim 1, wherein the figure of merit is at least one of a noise figure, a third order intercept, a gain, and an attenuation.

10. The method according to claim 1, wherein the figure of merit is measured at an analog-to-digital converter that is part of the signal chain.

11. The method according to claim 1, wherein a sensitivity of the contribution of the respective component under test to at least one of the overall figure of merit, a third order intercept point, a noise figure, and a different figure of merit of the signal chain is determined, wherein the sensitivity gives information about a reliability of identifying the contribution of the respective component under test to the at least one of the overall figure of merit, the third order intercept point, the noise figure, and the different figure of merit when capturing the measurement signal in view of the component's settings.

12. The method according to claim 11, wherein the component's settings are modified upon repetitions of capturing the measurement signal if the sensitivity is below a predetermined threshold value.

13. The method according to claim 11, wherein an output signal is output in case the sensitivity determined is low, wherein the output signal is a notification informing a user about the low sensitivity or a control signal that alters the at least one setting and initializes capturing of an additional measurement signal.

14. The method according to claim 11, wherein the sensitivity determined is output via a user interface.

15. The method according to claim 11, wherein limits for the sensitivity are input via a user interface.

16. The method according to claim 1, wherein a figure of merit of an external component or a contribution of the external component to the overall figure of merit is input via user interface or a database.

17. A measurement instrument for determining a figure of merit of at least one component under test within a signal chain having several components, wherein the signal chain is an internal and/or external signal chain, wherein the measurement instrument includes circuitry configured to:
  capture a measurement signal at a port of the signal chain,
  determine an overall figure of merit of the signal chain, and
  repeatedly capturing the measurement signal at the port of the signal chain while altering at least one setting of one of the several components of the signal chain per repetition, wherein the overall figure of merit of the signal chain is determined for each repetition, and wherein the at least one setting is altered such that the contribution of the respective component under test to the overall figure of merit of the signal chain is increased with respect to contributions of remaining components of the signal chain.

18. The measurement instrument according to claim 17, wherein the measurement instrument is coupled to a signal generator capable of generating a measurement signal applied to the signal chain and/or a user interface capable of outputting the contribution of the respective component under test to the overall figure of merit of the signal chain.

19. The measurement instrument according to claim 17, comprising a determination circuit capable of determining the alternation of the at least one setting.

* * * * *